(12) United States Patent
Giorgi et al.

(10) Patent No.: US 11,121,419 B2
(45) Date of Patent: Sep. 14, 2021

(54) BATTERY HEAT MANAGEMENT

(71) Applicants: Michael E. Giorgi, Hudson, OH (US); Patrick M. Mause, Streetsboro, OH (US); Steven Rosen, Hunting Valley, OH (US)

(72) Inventors: Michael E. Giorgi, Hudson, OH (US); Patrick M. Mause, Streetsboro, OH (US); Steven Rosen, Hunting Valley, OH (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 0 days.

(21) Appl. No.: 16/151,424

(22) Filed: Oct. 4, 2018

(65) Prior Publication Data

US 2019/0109477 A1      Apr. 11, 2019

Related U.S. Application Data

(60) Provisional application No. 62/571,007, filed on Oct. 11, 2017.

(51) Int. Cl.
*H01M 10/613* (2014.01)
*H02J 7/00* (2006.01)
(Continued)

(52) U.S. Cl.
CPC ....... *H01M 10/613* (2015.04); *H01M 10/615* (2015.04); *H01M 10/63* (2015.04);
(Continued)

(58) Field of Classification Search
USPC ........................................................ 320/134
See application file for complete search history.

(56) References Cited

U.S. PATENT DOCUMENTS

| 5,251,815 A | 10/1993 | Foye |
| 5,991,429 A | 11/1999 | Coffin et al. |

(Continued)

FOREIGN PATENT DOCUMENTS

| CN | 105425711 A | 3/2016 |
| JP | H0677558 B2 | 10/1994 |

OTHER PUBLICATIONS

Non-Final Office Action received for U.S. Appl. No. 16/151,387 dated Jan. 27, 2020, 29 pages.

(Continued)

*Primary Examiner* — Mohammed Alam
(74) *Attorney, Agent, or Firm* — Amin, Turocy & Watson, LLP

(57) ABSTRACT

Systems and methods for managing and utilizing heat associated with battery charge and/or discharge cycles are described herein. A system as described herein includes a battery array comprising one or more batteries, a heat collector physically coupled to respective batteries of the battery array that captures heat associated with at least one of charge cycles or discharge cycles of the respective batteries of the battery array, and a routing controller communicatively coupled to the heat collector that initiates transference of the heat captured by the heat collector as an energy source to one or more subsystems that are distinct from the heat collector.

20 Claims, 10 Drawing Sheets

(51) Int. Cl.
  *H01M 10/659* (2014.01)
  *H02J 7/35* (2006.01)
  *H01M 10/615* (2014.01)
  *H01M 10/63* (2014.01)
  *H01M 16/00* (2006.01)
  *H01M 10/6567* (2014.01)
  *H01M 10/66* (2014.01)

(52) U.S. Cl.
  CPC ..... *H01M 10/659* (2015.04); *H01M 10/6567* (2015.04); *H01M 10/66* (2015.04); *H01M 16/00* (2013.01); *H02J 7/0021* (2013.01); *H02J 7/35* (2013.01); *H01M 2220/10* (2013.01); *H02J 2207/40* (2020.01)

(56) References Cited

U.S. PATENT DOCUMENTS

| | | | |
|---|---|---|---|
| 6,578,675 | B2 | 6/2003 | Wilson et al. |
| 9,696,055 | B1 | 7/2017 | Goodman et al. |
| 2002/0066621 | A1 | 6/2002 | Wilson et al. |
| 2005/0144437 | A1 | 6/2005 | Ransom et al. |
| 2006/0252530 | A1 | 11/2006 | Oberberger et al. |
| 2009/0139781 | A1* | 6/2009 | Straubel ............ B60L 50/64 180/65.1 |
| 2010/0104935 | A1* | 4/2010 | Hermann .......... H01M 10/6554 429/120 |
| 2011/0223450 | A1* | 9/2011 | Horne ................ H01M 8/188 429/72 |
| 2011/0247351 | A1* | 10/2011 | Alston ................ F25B 25/00 62/235.1 |
| 2012/0190386 | A1 | 7/2012 | Anderson |
| 2013/0069543 | A1 | 3/2013 | Mohan et al. |
| 2013/0171491 | A1* | 7/2013 | Wei .................... H01M 2/1077 429/120 |
| 2013/0318343 | A1 | 11/2013 | Bjarnason et al. |
| 2013/0340802 | A1* | 12/2013 | Jovovic ............... H01L 35/30 136/201 |
| 2014/0032034 | A1 | 1/2014 | Raptopoulos et al. |
| 2014/0132390 | A1 | 5/2014 | Loveland et al. |
| 2014/0214504 | A1 | 7/2014 | Young et al. |
| 2015/0088312 | A1 | 3/2015 | Lo et al. |
| 2016/0174334 | A1 | 6/2016 | Anthony et al. |
| 2016/0183037 | A1 | 6/2016 | Grohman |
| 2016/0196131 | A1 | 7/2016 | Searle et al. |
| 2016/0294605 | A1 | 10/2016 | Searle et al. |
| 2016/0325962 | A1 | 11/2016 | Blandin et al. |
| 2016/0335865 | A1 | 11/2016 | Sayavong et al. |
| 2017/0108236 | A1 | 4/2017 | Guan et al. |
| 2017/0309977 | A1* | 10/2017 | Subba ................ H01M 10/625 |
| 2017/0346295 | A1 | 11/2017 | Yoscovich et al. |
| 2017/0369184 | A1 | 12/2017 | Di Benedetto et al. |
| 2018/0176017 | A1 | 6/2018 | Rodriguez et al. |
| 2018/0247474 | A1 | 8/2018 | Matsuyama |
| 2018/0249297 | A1 | 8/2018 | Taylor |
| 2019/0109477 | A1* | 4/2019 | Giorgi ................ H02J 3/386 |

OTHER PUBLICATIONS

Final Office Action received for U.S. Appl. No. 16/151,387 dated Jun. 18, 2020, 39 pages.
Non-Final Office Action received for U.S. Appl. No. 16/151,387 dated Mar. 22, 2021, 66 pages.
Non-Final Office Action received for U.S. Appl. No. 16/151,391 dated Sep. 8, 2020, 32 pages.
Non-Final Office Action received for U.S. Appl. No. 16/151,396 dated Jan. 13, 2021, 23 pages.
Final Office Action received for U.S. Appl. No. 16/151,396 dated Apr. 23, 2021, 36 pages.
Non-Final Office Action received for U.S. Appl. No. 16/151,412 dated Aug. 17, 2020, 25 pages.
Final Office Action received for U.S. Appl. No. 16/151,412 dated Feb. 10, 2021, 41 pages.
Notice of Allowance received for U.S. Appl. No. 16/206,320 dated Feb. 28, 2020, 18 pages.
Final Office Action received for U.S. Appl. No. 16/151,391 dated Jun. 21, 2021, 33 pages.
Mel et al.,"The NIST Definition of Cloud Computing", National Institute of Standards and Technology, Special Publication 800-145, Sep. 2011, 7 pages.

* cited by examiner

BATTERY HEAT MANAGEMENT

CROSS-REFERENCE TO RELATED APPLICATIONS

This application claims priority to U.S. Provisional Patent Application Ser. No. 62/571,007 filed on Oct. 11, 2017, entitled "BATTERY HEAT MANAGEMENT." The entirety of the aforementioned application is incorporated by reference herein.

BACKGROUND

Developments in energy technology have resulted in increased adoption of renewable energy sources, such as windmills, solar panels, or the like. In order to improve efficiency associated with renewable energy sources, energy can be produced during a given time interval (e.g., daytime, periods of wind, etc.) and either used or stored by charging one or more batteries (e.g., batteries arranged in a battery array or cluster). The stored energy can then be used at a later time, e.g., by discharging the batteries.

Batteries naturally produce heat when charging and discharging due to, e.g., exothermic chemical changes occurring in the batteries. The amount of heat produced by a battery array can be based on the speed at which the batteries of the array are being charged and/or discharged as well as other factors.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In one embodiment, a system is described herein. The system includes a battery array including one or more batteries, a heat collector physically coupled to respective batteries of the battery array that captures heat associated with charge cycles and/or discharge cycles of the respective batteries of the battery array, and a routing controller communicatively coupled to the heat collector that initiates transference of the heat captured by the heat collector as an energy source to one or more subsystems that are distinct from the heat collector.

In another embodiment, a method is described herein. The method includes capturing heat associated with charge cycles and/or discharge cycles of respective batteries of a battery array, resulting in captured heat, monitoring a status of one or more subsystems associated with the battery array, and initiating transfer of the captured heat as an energy source to respective ones of the one or more subsystems based on the monitoring.

In a further embodiment, a non-transitory computer readable storage medium is described herein. The storage medium has stored thereon instructions that, when executed by at least one processor of a power routing controller, cause the power routing controller (e.g., via the at least one processor) to receive information associated with captured heat associated with charge cycles and/or discharge cycles of respective batteries of a battery array, monitor a status of one or more subsystems associated with the battery array, and initiate transfer of the captured heat as an energy source to respective ones of the one or more subsystems based on the status of the one or more subsystems.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide methods, systems, and user interfaces that leverage battery heat from battery charge and discharge cycles, e.g., in a home automation network. Batteries naturally produce heat when charging and discharging due to exothermic chemical changes occurring in the batteries. The amount of heat produced can be based on factors such as how rapidly the batteries are being charged and/or discharged. This heat can be converted into electricity to power home automation systems and/or other devices, used to heat water or heat living spaces, and/or leveraged for other purposes as described herein.

Figure 1:
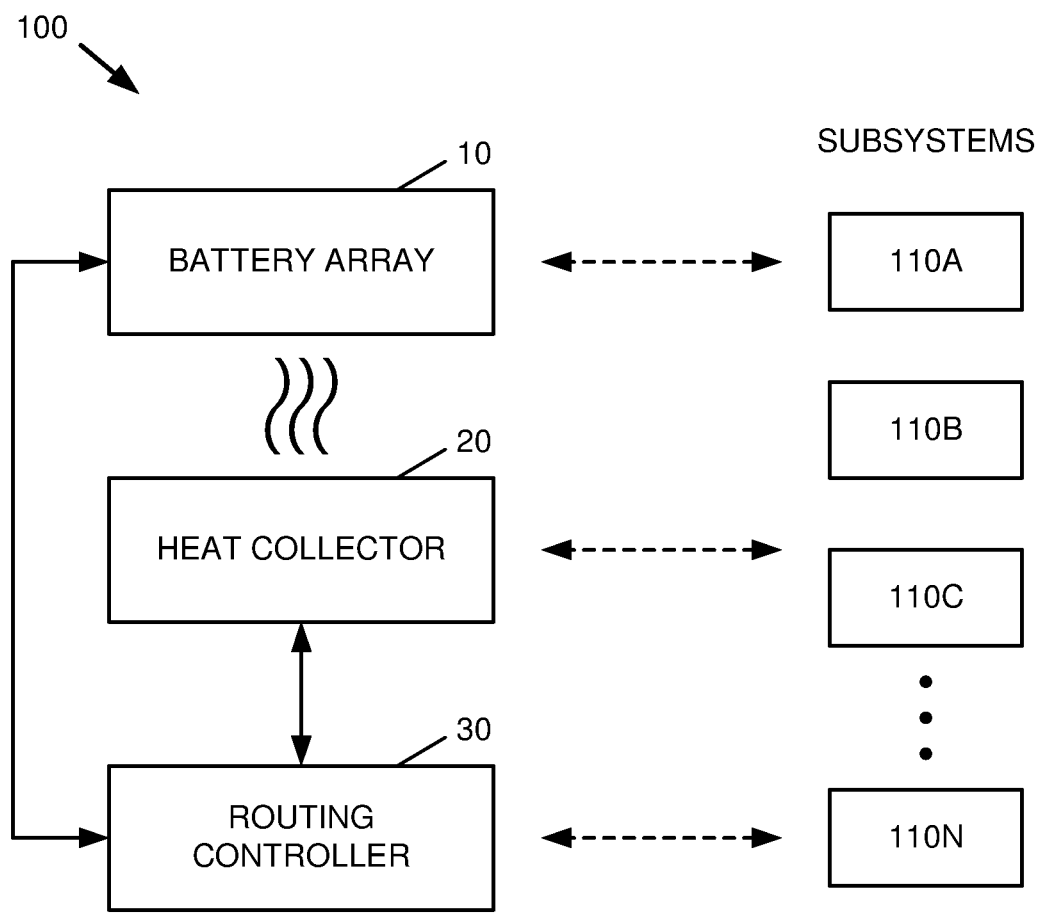
FIG. 1 is a block diagram of a system that facilitates energy routing and management in accordance with one or more embodiments described herein.

Referring first to FIG. 1, shown is a system 100 that facilitates energy routing and management in accordance with one or more embodiments described herein. The system 100 includes a battery array 10 that can include one or more batteries. The battery array 10, along with or independently from one or more external power sources, can be used to provide electrical energy to one or more subsystems 110A-N.

In an aspect, batteries of the battery array 10 are rechargeable batteries that can receive and store power from one or more sources that are distinct from the battery array 10. These sources can include, but are not limited to, an external power grid, electrical generators (e.g., solar panels, windmills, combustion-powered generators, etc.), or the like. Additionally, the battery array 10 can be physically configured in any suitable configuration. For instance, the battery array 10 can be, or include, a battery bank that is mounted to a wall of a structure and/or otherwise fixed in a single location, a removable or transferable battery pack (e.g., a battery pack for an electric vehicle, etc.), and/or any other battery(-ies) in any suitable configuration(s).

The batteries of the battery array 10 can be of any suitable type, such as lithium-ion, lithium-ion polymer, nickel-metal hydride, and/or any other rechargeable battery technology either presently existing or developed in the future. Further, the batteries of the battery array 10 could be of a uniform composition or a variety of compositions. For example, the battery array 10 can include batteries of a first composition for powering a first subsystem 110A and additional batteries of a second, different composition for powering a second subsystem 110B. Similarly, the batteries of the battery array 10 can be similar in capacity or have different capacities.

The subsystems 110 shown in system 100 can include one or more devices or groups of devices that are configured to receive energy derived from the battery array 10, electrical energy and/or other forms of energy as described herein. By way of example, the subsystems 110 can include an electrical subsystem for a house or other structure, a plumbing system for one or more structures, an HVAC (heating, ventilation and air conditioning) and/or climate control system, an electric vehicle such as an electric car, tractor, motorcycle, etc., and/or any other device(s) in any suitable configuration(s). Various non-limiting examples of subsystems 110 that can be utilized in the context of system 100 are described in further detail below.

In an aspect, the batteries of the battery array 10 can produce heat while charging (e.g., receiving and storing power from one or more sources) and/or discharging (e.g., providing stored power to one or more of the subsystems 110). Excessive heat from charging/discharging in this manner can be detrimental to performance/lifespan of the battery array 10. Accordingly, system 100 includes a heat collector 20 that captures and/or otherwise redirects heat produced by charge cycles and/or discharge cycles of the battery array 10, thereby maintaining the battery array 10 within a desired temperature range. The heat collector 20 can further be used to transfer heat produced by the battery array 10, either directly or indirectly, to one or more of the subsystems 110. In one example, the heat collector 20 can be positioned physically near the battery array 10, e.g., within or as part of an enclosure of the battery array 10, in order to improve the flow of thermal energy from the battery array 10 to the heat collector 20.

As additionally shown in system 100, a routing controller 30 can be used to initiate transference of battery heat captured by the heat collector 20 in various manners as described herein. In various embodiments, the routing controller 30 can be implemented via hardware, software, or a combination of hardware and software. For example, the routing controller 30 can be implemented via a dedicated power routing device, which can be a computing system, comprising a memory at least one processor, that is designed for the limited and specific purpose of controlling the battery array 10 and/or the heat collector 20. The routing controller 30, in some implementations, could be implemented as a reduced instruction set computer (RISC) and/or configured via one or more specialized architectures that improve operational efficiency of the routing controller 30 in exchange for rendering the routing controller 30 less suitable, or unsuitable, for use as a general-purpose computer. Other implementations of the routing controller could also be used. Various non-limiting examples of operations that can be performed by the routing controller 30 with respect to the battery array 10 and/or heat collector 20 are provided in further detail below.

Figure 2:
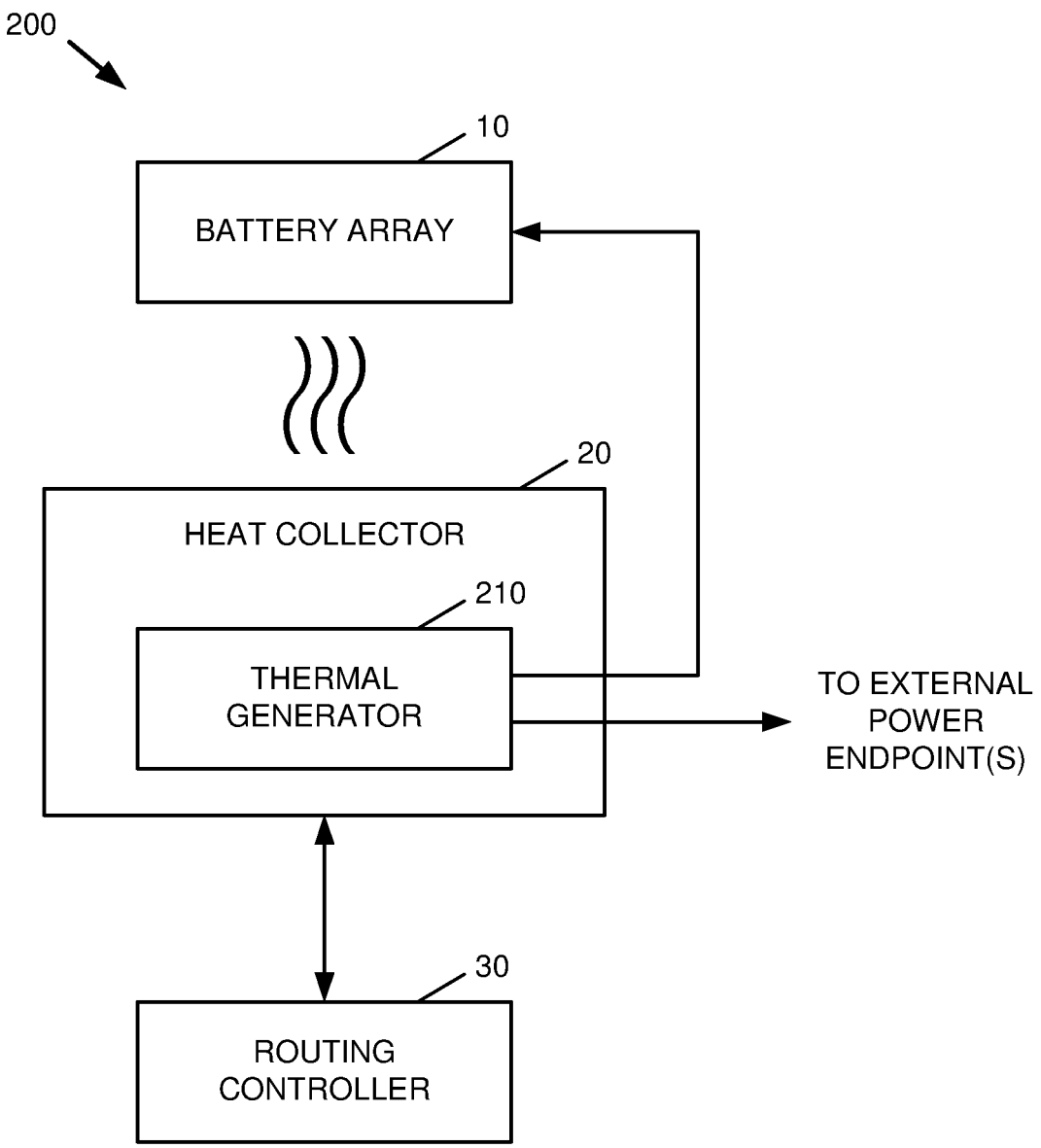
FIG. 2 is a block diagram of a system that facilitates generation of electrical energy from battery heat and distribution of generated electrical energy in accordance with one or more embodiments described herein.

Turning next to FIG. 2, a system 200 is shown in which the heat collector 20 converts heat produced by the battery array 10 to electrical energy via a thermal generator 210. In an aspect, the thermal generator 210 can produce electrical energy from heat collected from the battery array 10 by leveraging the Seebeck effect, in which a temperature gradient between two dissimilar conductors produces a current between the conductors. To this end, the thermal generator 210 can be, or otherwise include, a solid state Seebeck generator and/or any other suitable device(s) or component(s).

In another aspect, the routing controller 30 can facilitate transfer of electrical energy converted by the thermal generator 210 from thermal energy to one or more devices and/or subsystems. By way of example, the routing controller 30 can direct converted electrical energy to one or more external endpoints, such as an external power grid or one or more subsystems 110 as shown in FIG. 1. Also or alternatively, the routing controller can direct converted electrical energy back to the battery array 10, e.g., to at least partially recharge the batteries of the battery array 10 during a charge cycle of the battery array 10. Various techniques by which the routing controller 30 can direct electrical energy between devices and/or subsystems are described in further detail below with respect to FIGS. 6-7.

Figure 3:
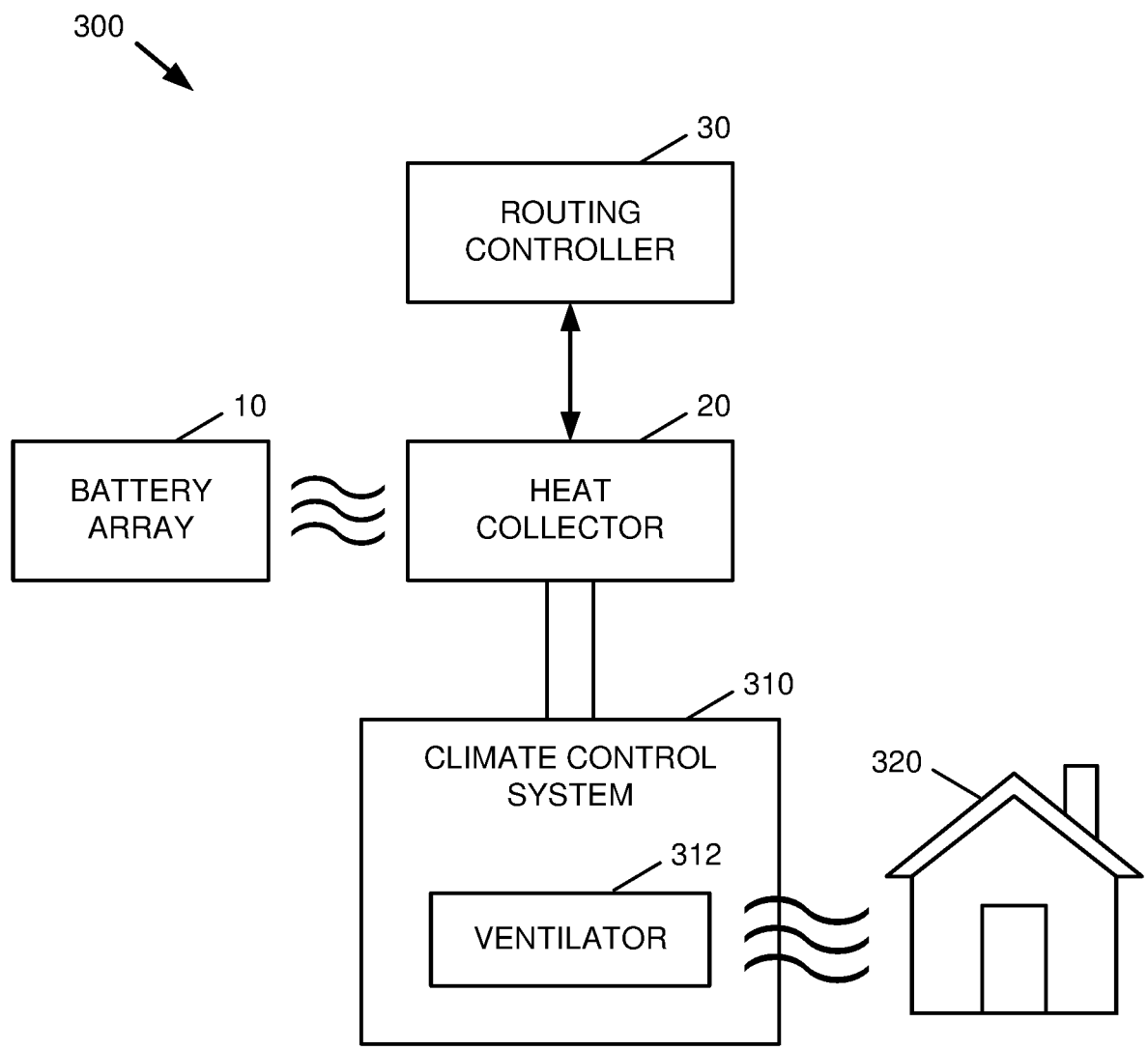
FIG. 3 is a block diagram of a system that facilitates environmental heating via heat collected from a battery array in accordance with one or more embodiments described herein.

With reference next to FIG. 3, a system 300 for environmental heating using thermal energy collected from a battery array 10 is illustrated. The system 300 as shown includes a heat collector 20, which captures and/or otherwise redirects heat from a battery array 10 as described above. As further shown in system 300, the heat collector 20 is mechanically coupled, via ducts, pipes, or other structures, to a climate control system 310. Here, the climate control system 310 is an HVAC system and/or other suitable system for controlling the ambient temperature of a structure 320 (e.g., a house, garage, office building, etc.) or rooms and/or other component parts of a structure 320. The climate control system 310 includes one or more ventilators 312, which can circulate air throughout the climate control system 310 and its associated structure 320 via fans or other means.

In an aspect, the routing controller 30 can direct battery heat captured by the heat collector 20 from the battery array 10 to the climate control system 310 under certain circumstances. The battery heat transferred to the climate control system 310 can, in turn, be used to heat an area associated with the climate control system 310, e.g., the structure 320, via the ventilator 312.

In one example, the routing controller 30 can drive a motor that controls a vent between the heat collector 20 and the climate control system 310, thereby selectively physically opening and closing airflow between the heat collector 20 and the climate control system 310. Also or alternatively, the routing controller 30 can directly or indirectly control the ventilator 312 of the climate control system 310, e.g., to distribute battery heat only at desired times. In another aspect, the routing controller 30 can regulate the flow of heat captured by the heat collector 20 through the climate control system 310 and/or its associated structure 320 based on ambient temperature of the structure 320 (e.g., as compared to a desired temperature), temperature of the battery array, a predetermined schedule and/or other time inverval(s), and/or any other suitable factors.

Figure 4:
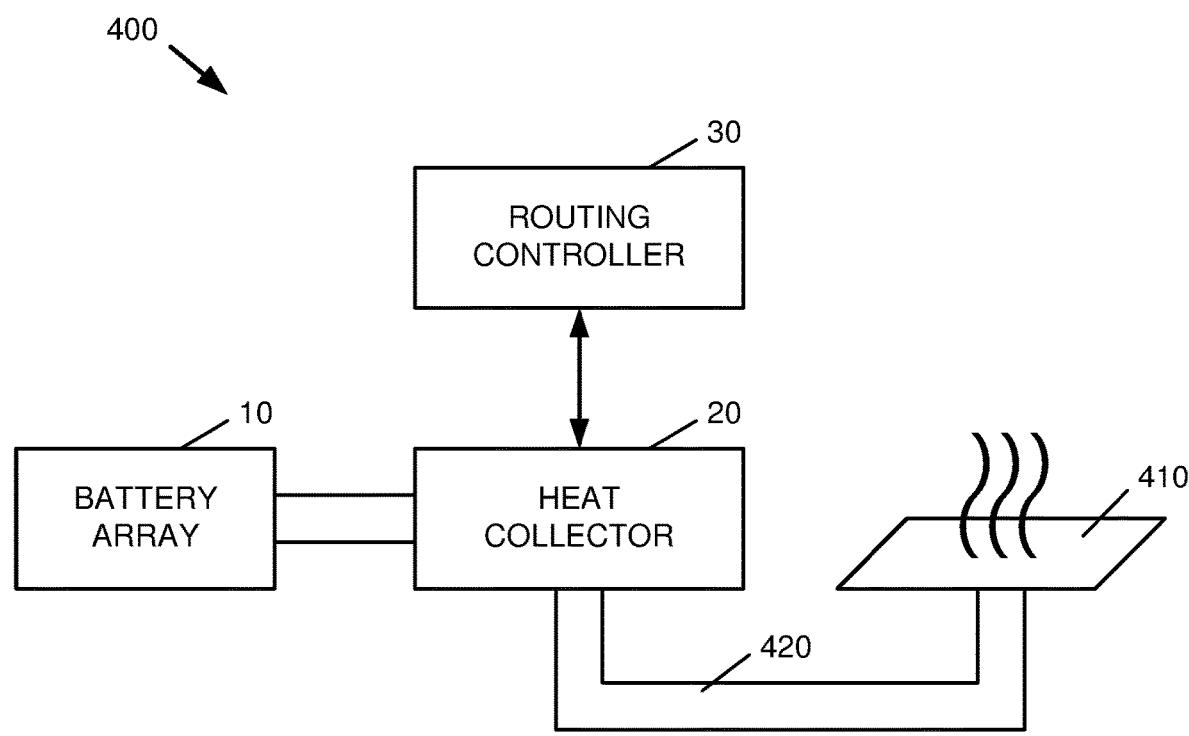
FIG. 4 is a block diagram of a system that facilitates surface heating via heat collected from a battery array in accordance with one or more embodiments described herein.

Referring next to FIG. 4, a system 400 is illustrated that facilitates surface heating via heat collected by a heat collector 20 from a battery array 10. As shown in system 400, the heat collector 20 is operatively coupled to the battery array and a surface 410 using a heat conductor 420. The heat conductor 420 can be, e.g., a heat sink, heat pipe, and/or other structure(s) physically coupled to the battery array 10 and/or surface 420 that are operable to transfer heat away from the battery array 10. The heat conductor 420 can be composed of aluminum, copper, and/or any other suitable heat conductive material(s).

The surface 410 coupled to the heat conductor 420 can be any suitable surface of any size. By way of example, the surface 410 can be a table surface or countertop, a floor in a garage or other structure, a driveway, a sidewalk, a turf surface (e.g., in a sports arena), or the like. By channeling heat from the battery array 10 to the surface 410 via the heat conductor 420, the surface 410 can be de-iced and/or otherwise heated using the captured battery heat.

In an aspect, the heat collector 20 can be implemented in the heat conductor 420 itself. Alternatively, the heat collector 20 can be an electrical and/or mechanical component associated with and controlled by the routing controller 30. For instance, the heat collector 20 can selectively activate and/or deactivate surface heating as shown in system 400 based on commands received from the routing controller 30.

In another aspect, a portion of the heat conductor 420 that contacts and/or otherwise interfaces with the surface 410 can be configured to distribute heat substantially evenly along some or all of the surface 410. For instance, the heat conductor 420 can utilize coils, wires, and/or other suitably patterned heat conductive structures to regulate the distribution of heat applied to the surface 410.

Figure 5:
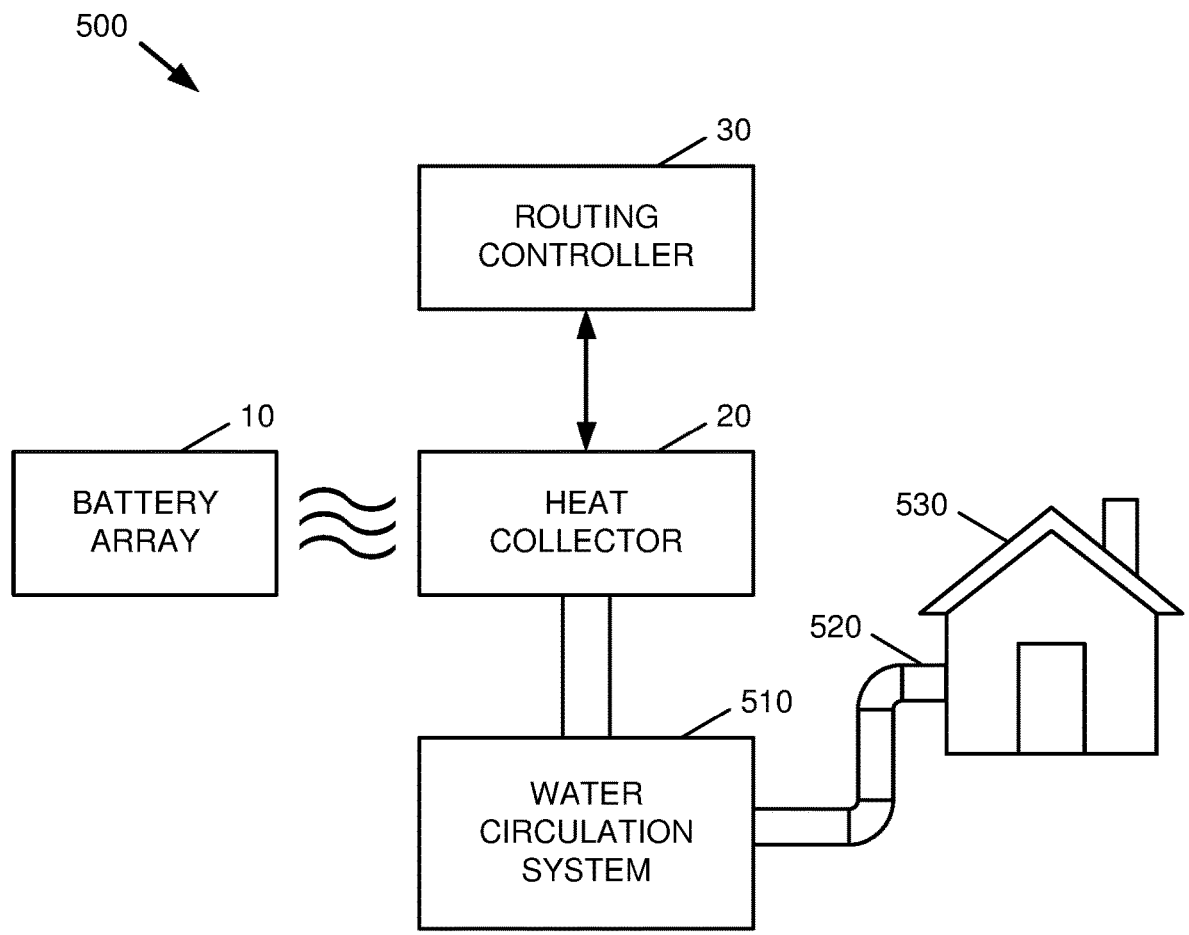
FIG. 5 is a block diagram of a system that facilitates water heating via heat collected from a battery array in accordance with one or more embodiments described herein.

Turning now to FIG. 5, a system 500 for water heating using thermal energy collected from a battery array 10 is illustrated. The system 500 as shown includes a heat collector 20, which captures and/or otherwise redirects heat from a battery array 10 as described above. The heat collector 20 can be mechanically coupled via ducts, pipes, or other structures, to a water circulation system 510. The water circulation system 510 can be a closed system, or alternatively the water circulation system 510 can be connected to a plumbing system that includes a network of pipes 520 and/or other means that provide water to a structure 530 (e.g., a house, a public building, etc.) or rooms and/or other component parts of a structure 530.

In an aspect, the routing controller 30 can direct battery heat captured by the heat collector 20 from the battery array 10 to the water circulation system 510 under certain circumstances. The transfer of heat from the heat collector 20 to the water circulation system 510 can result in the production of heated water by the water circulation system 510, which can in turn be circulated to a plumbing system for the structure 530, e.g., via the pipes 520.

In one example, the routing controller 30 can drive a motor that controls a heat conductive interface (e.g., a heat conductor 420 as described with respect to FIG. 4) between the heat collector 20 and the water circulation system 510, thereby facilitating the selective transfer of heat from the heat collector 20 to the water circulation system 510. Also or alternatively, the routing controller 30 can directly or indirectly control the water circulation system 510, e.g., to heat water using thermal energy provided by the heat collector 20 only at desired times. In another aspect, the routing controller 30 can regulate the flow of heat captured by the heat collector 20 through the water circulation system 510 in addition to, or in place of, a conventional water heater associated with the structure 530.

Figure 6:
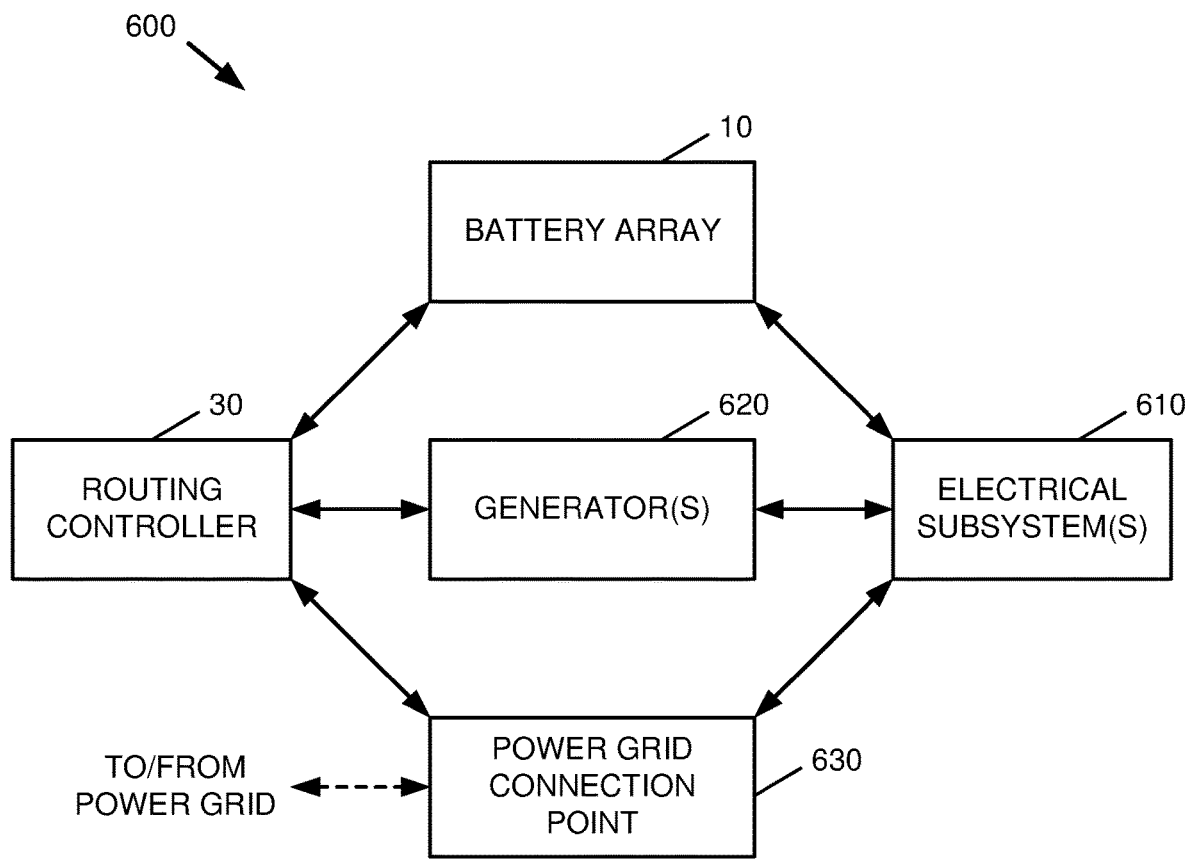
FIG. 6 is a block diagram of a system that facilitates routing of electrical energy from one or more sources to respective electrical subsystems in accordance with one or more embodiments described herein.

With reference next to FIG. 6, a system 600 for routing electrical energy from one or more sources to respective electrical subsystems 610 is illustrated. The electrical subsystems 610 shown in system 600 can include devices or groups of devices that operate via electrical energy. For instance, a first subsystem 610 could include an electric vehicle, a second subsystem 610 could include devices associated with one or more rooms of a structure, a third subsystem 610 could be a general electrical connection for all or part of a structure, and so on. Other subsystems 610 could also be used.

In an aspect, respective electrical subsystems 610 can be configured to receive electrical energy from respective power sources under certain circumstances. These sources can include, but are not limited to, a battery array 10 that can operate as generally described herein, one or more electrical generators 620, and/or an external power grid via a power grid connection point 630. The generators 620 can include devices such as a windmill or wind generator, a solar generator, a hydroelectric generator, a gasoline, natural gas, or other combustion-powered generator, and/or any other suitable mechanism(s) for providing power to the electrical subsystems 610. The power grid connection point 630 can be a service box and/or other interface that links an external power grid to a localized electrical system.

In another aspect, the routing controller 30 can select one or more sources to be utilized by an electrical subsystem at a given time from among, e.g., the battery array 10, the generator(s) 620, and/or the external grid via the connection point 630. In one example, as shown by system 600, the routing controller 30 can be communicatively coupled to respective energy sources and facilitate provision of electrical energy from one or more of the connected sources to a given electrical subsystem 610 via a common infrastructure utilized by each of the connected sources in a manner substantially transparent to the electrical subsystem, i.e., such that the subsystem 610 need not be directly connected to the routing controller 30. Also or alternatively, an electrical subsystem 610 can maintain separate electrical connections to respective sources and receive commands via the routing controller 30 regarding which connection(s) to use for receiving electrical energy at a given time.

In a further aspect, the routing controller 30 can be integrated into a home automation system and/or another suitable infrastructure for regulating power generation and use with little or no manual user input. The routing controller 30 can in some cases select a power source (or combination of sources) for a given electrical subsystem 610 based on an estimated energy cost, e.g., a cost per kilowatt-hour or other unit for energy obtained from an external grid. This cost can be time varying, e.g., a first rate may apply for peak demand periods while a second, lower rate may apply for periods of lesser demand. The energy cost can also or alternatively be tiered, e.g., such that different rates are applied for energy use based on the amount of energy used in a given period. The routing controller 30 can also select sources based on estimated energy use and/or demand associated with a subsystem, estimated stress on the battery array 10 associated with powering the subsystem, a predetermined schedule (e.g., the battery array 10 may be configured to charge and discharge at regular time intervals), and/or other suitable factors.

Figure 7:
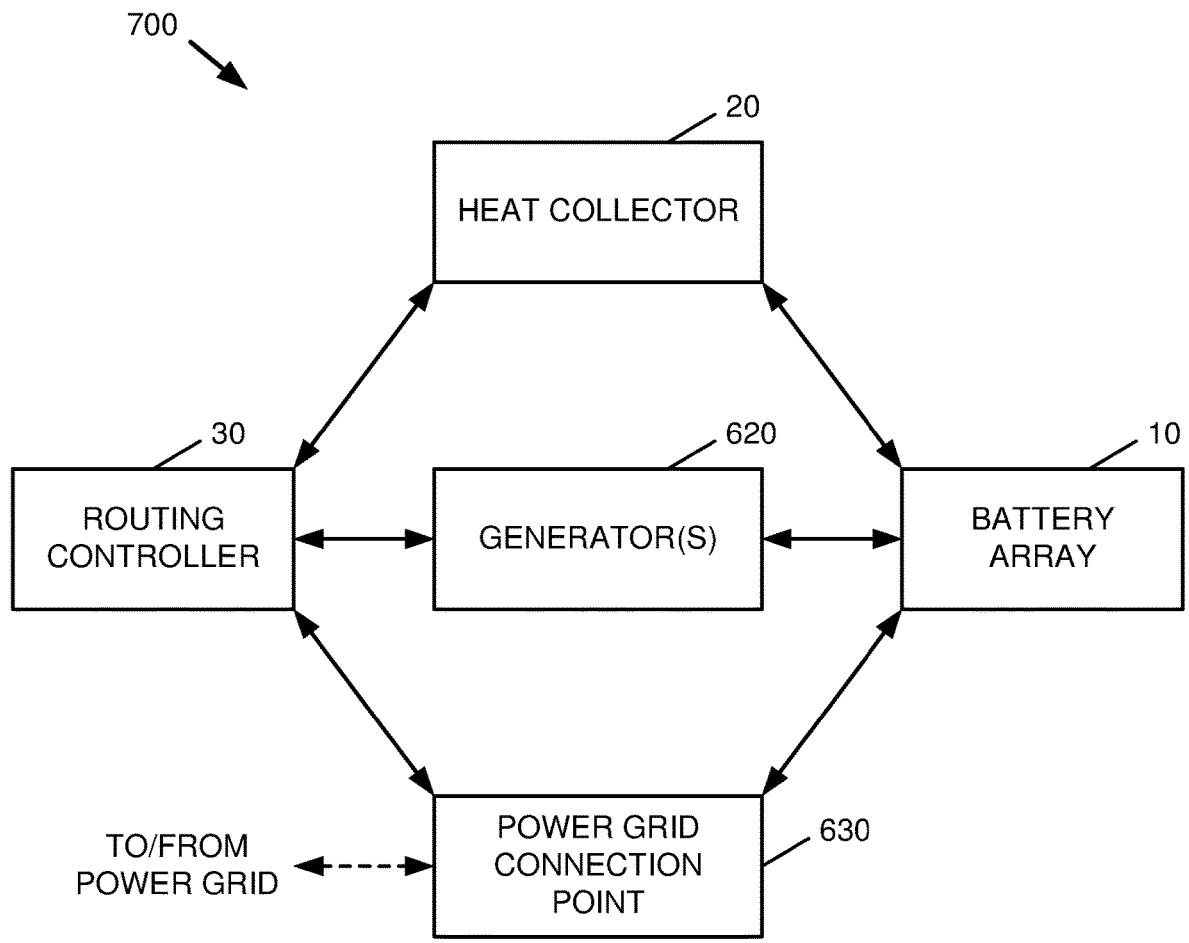
FIG. 7 is a block diagram of a system that facilitates routing of electrical energy from one or more sources for charging a battery array in accordance with one or more embodiments described herein.

Turning now to FIG. 7, a system 700 for routing of electrical energy from one or more sources to a battery array 10, e.g., to charge respective batteries of the battery array 10, is illustrated. The system 700 includes a routing controller 30, which selects a power source for charging the batteries of the battery array 10 from among one or more sources connected to the routing controller 30 and the battery array 10. These sources can include, but are not limited to, the heat collector 20 (e.g., via a Seebeck generator and/or other means associated with the heat collector 20 for converting heat to electrical energy), one or more generators 620, and/or an external power grid via a power grid connection point 630 as described above with respect to FIG. 6.

In a similar manner to system 700 as described above, the routing controller 30, power sources 20, 620, 630, and battery array 10 can respectively be connected via a common electrical infrastructure such that power can be transferred between the battery array 10 and one or more other sources 20, 620, 630 in a manner transparent to either the battery array 10 or the individual sources.

In an aspect, respective batteries of the battery array 10 can include batteries used in a home or other building to modulate energy usage and capture. For instance, a building can have generators 620 such as a windmill, solar panels, or the like nearby to generate energy. Any surplus electricity, rather than being sold back to the grid, can be stored on site in one or more batteries of the battery array 10. In one example, the routing controller 30 can also configure the battery array 10 to store power from the grid, e.g., during off peak times, and discharge power during peak times to lower costs.

In another aspect, the routing controller 30 can select whether heat reclamation via the heat collector 20 is operative based on factors such as the temperature gradient, time of day, etc. As described above, the routing controller 30 can also select whether captured heat is used to warm ambient air and/or water, or whether a Seebeck generator associated with the heat collector 20 is used to convert the thermal energy to electrical energy.

Figure 8:
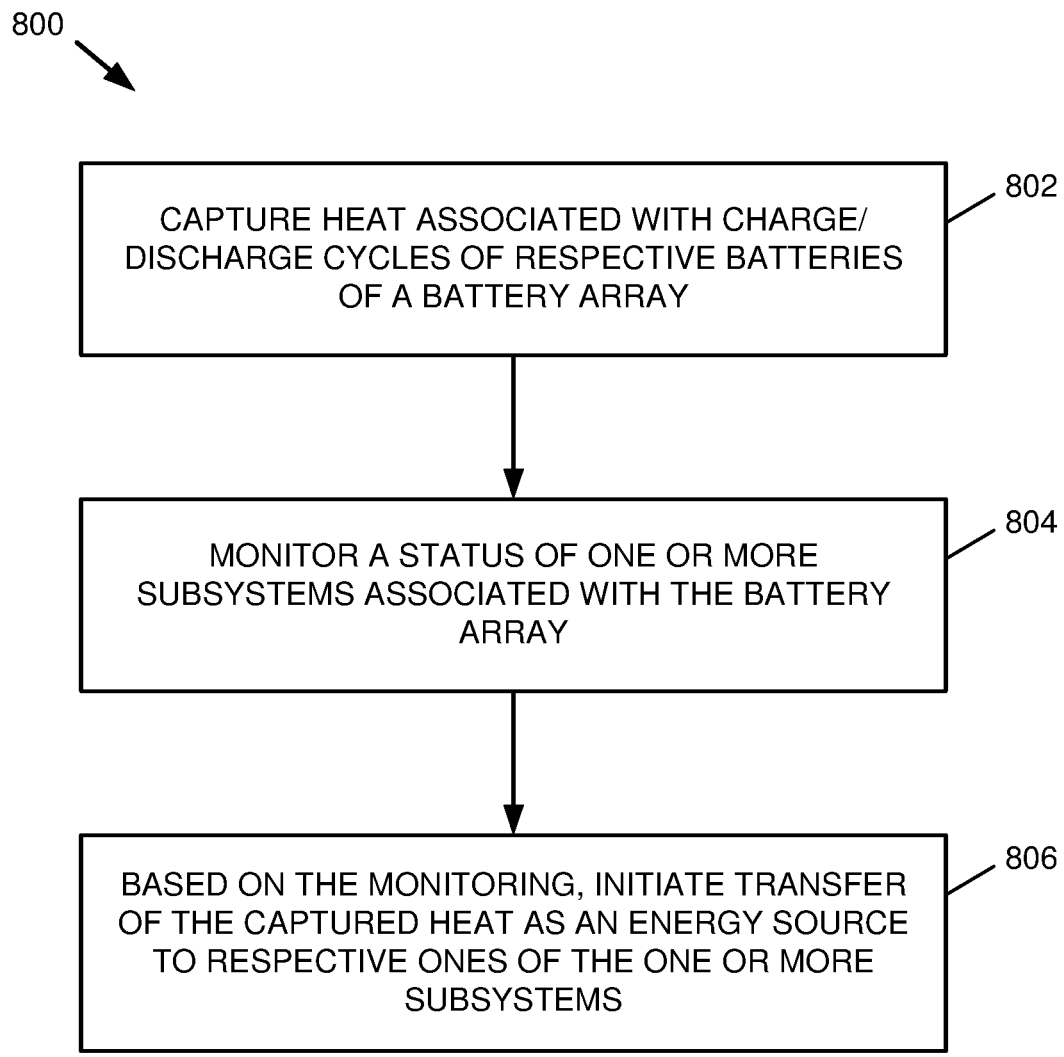
FIG. 8 is a block flow diagram of a process for collecting and managing heat produced by one or more batteries in accordance with one or more embodiments described herein.
Figure 9:
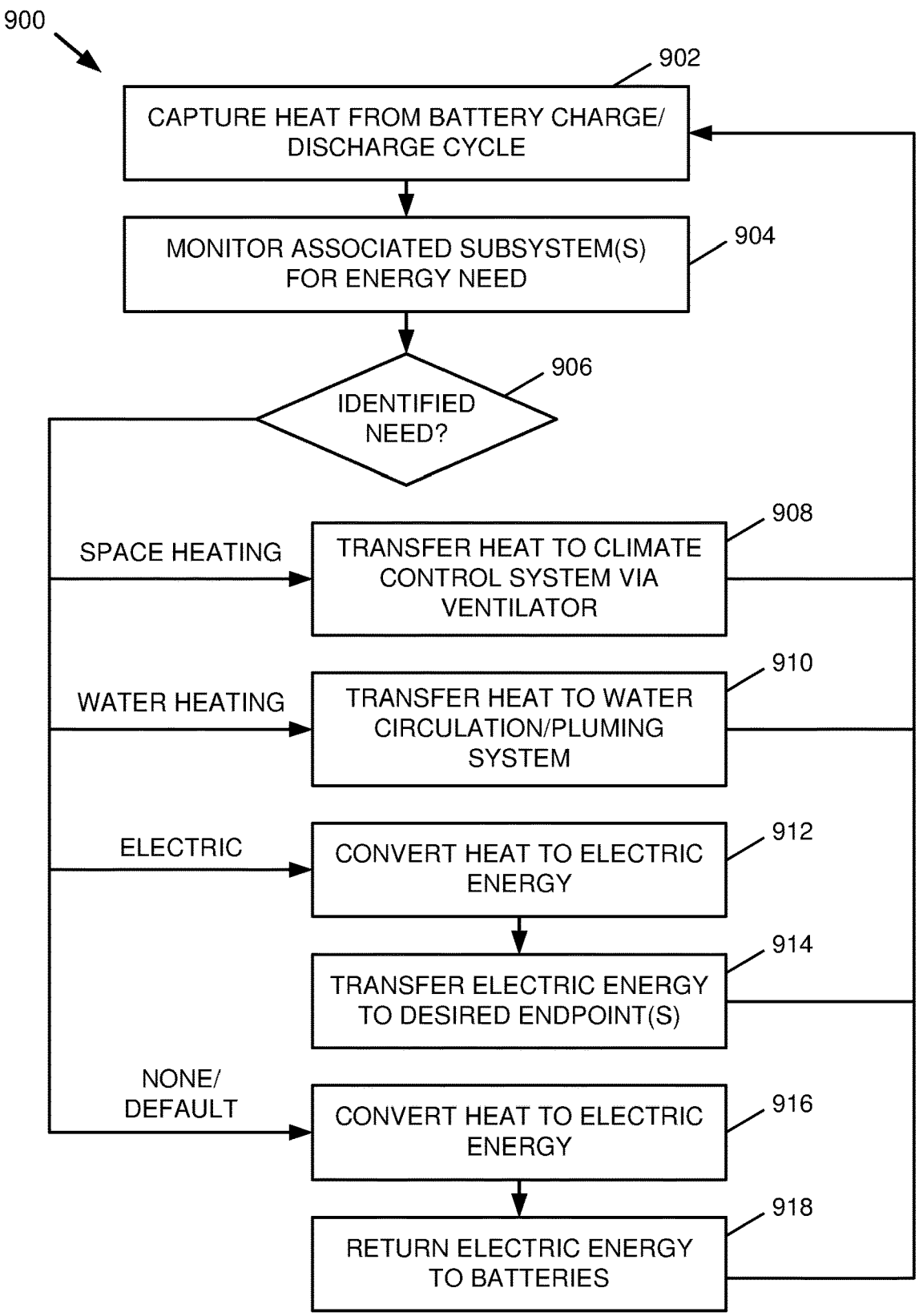
FIG. 9 is a block flow diagram of a process for routing energy derived from battery heat to one or more subsystems in accordance with one or more embodiments described herein.

With reference next to FIGS. 8-9, respective methods in accordance with certain aspects of this disclosure are illustrated. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Turning to FIG. 8, illustrated is a flow diagram of a process 800 for collecting and managing heat produced by one or more batteries in accordance with one or more embodiments described herein. At 802, heat associated with charge and/or discharge cycles of respective batteries of a battery array (e.g., battery array 10) is captured (e.g., by a heat collector 20).

At 804, a status of one or more subsystems associated with the battery array, such as subsystems 110 and/or electrical subsystems 610, is monitored (e.g., by a routing controller 30 and/or a device or system associated with the routing controller 30).

At 806, based on the monitoring performed at 804, a transfer is initiated (e.g., by the routing controller) of the heat captured at 802 as an energy source to respective ones of the subsystem(s) monitored at 804.

FIG. 9 illustrates a flow diagram of a process 900 for routing energy derived from battery heat to one or more subsystems (e.g., subsystems 110 and/or 610). At 902, heat associated with battery charge and/or discharge cycles is captured, e.g., by a heat collector 20 as described above. At 904, one or more subsystems associated with the batteries from which heat is captured at 902 is monitored, e.g., by a routing controller 904. Based on an identified energy need, process 900 branches from 906 to one or more of 908, 910, 912, and/or 916 as described below. It should be appreciated that process 900 can branch to multiple operations, or no operations, based on need(s) identified at 904.

At 908, if a need for space heating for a structure or other area is identified, heat captured at 902 is transferred to a climate control system (e.g., climate control system 310) via a ventilator (e.g., ventilator 312), as described above with respect to FIG. 3.

At 910, if a need for water heating is identified, heat captured at 902 is transferred to a water circulation system (e.g., water circulation system 510) and/or a plumbing system (e.g., a plumbing system including pipes 520), as described above with respect to FIG. 5.

At 912, if a need for electrical energy is identified, heat captured at 902 is converted to electrical energy, e.g., via a Seebeck generator associated with the heat collector and/or by other suitable means. Process 900 then proceeds to 914, wherein the electric energy produced at 912 is transferred to one or more desired endpoints (e.g., one or more electrical subsystems 610).

If no need is identified at 906, the system executing process 900 can perform either no action or a default action. In one example, a default action can begin at 916, wherein heat captured at 902 is converted to electrical energy, e.g., via a Seebeck generator associated with the heat collector and/or by other suitable means. Process 900 can then proceed to 918, wherein the electric energy produced at 912 is returned to the batteries from which the heat was captured at 902.

Figure 10:
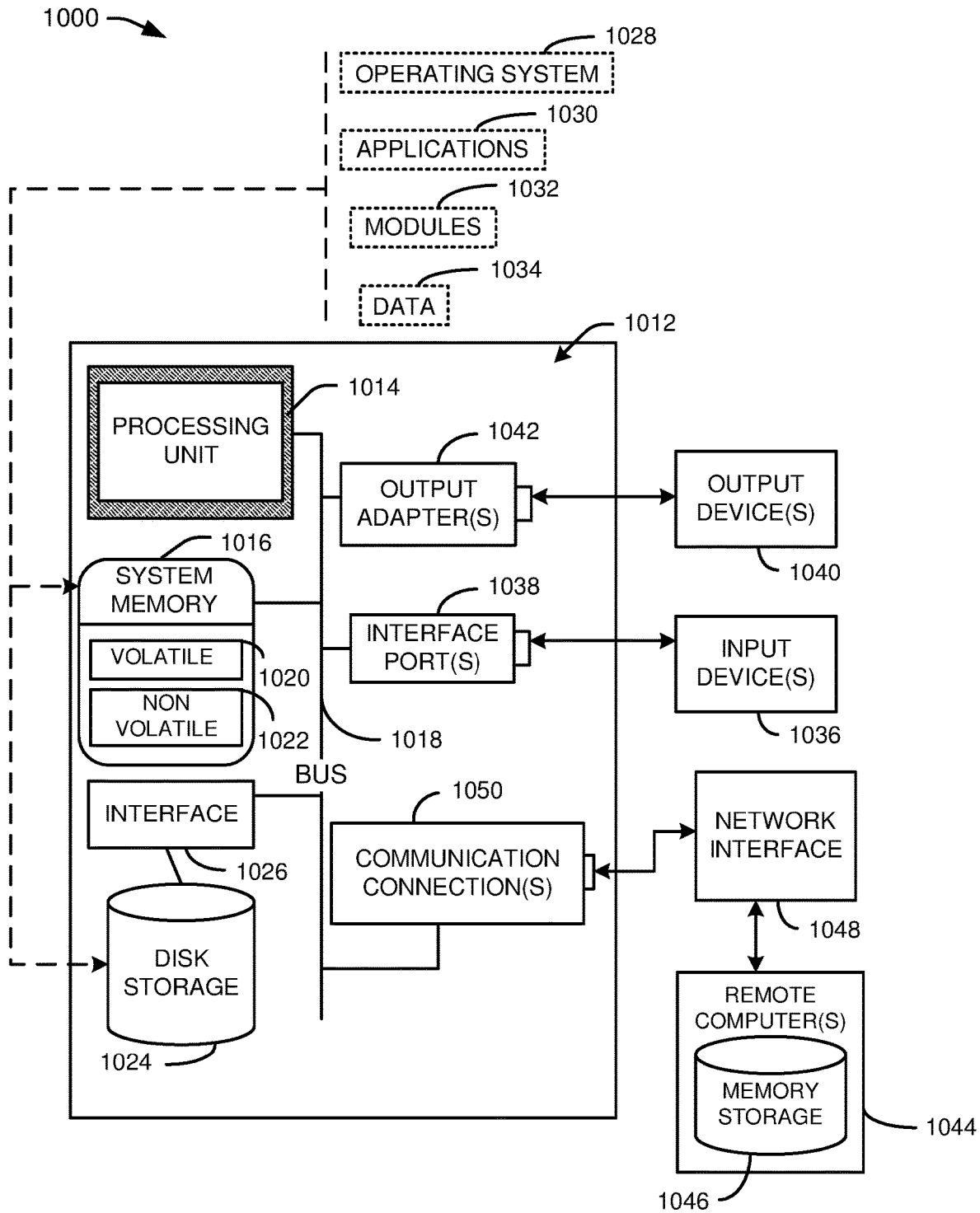
FIG. 10 is a block diagram of an example, non-limiting operating environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). While the internal HDD 1014 is illustrated as located within the computer 1002, the internal HDD 1014 can also be configured for external use in a suitable chassis (not shown). The HDD 1014, magnetic FDD 1016 and optical disk drive 1020 can be connected to the system bus 1008 by an HDD interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A system, comprising:
a battery array comprising one or more batteries;

a heat collector physically coupled to respective batteries of the battery array that captures heat associated with at least one of charge cycles or discharge cycles of the respective batteries of the battery array;
a thermal generator configured to convert at least a portion of the heat captured by the heat collector to electrical energy, resulting in converted electrical energy;
a processor; and
a memory communicatively coupled to the processor, the memory having stored therein computer-executable components, comprising:
a routing controller that:
initiates transfer of the at least the portion of the heat captured by the heat collector to the thermal generator to generate the converted electrical energy,
monitors a status of a device; and
based on the status, initiates transfer of part of the converted electrical energy as an energy source to the device.

2. The system of claim 1, wherein the thermal generator transfers another part of the converted electrical energy to the battery array during a charge cycle of the battery array.

3. The system of claim 1, wherein the device is a climate control system comprising a ventilator, and wherein the climate control system is configured to heat an area associated therewith via the ventilator using heat transferred to the climate control system.

4. The system of claim 1, wherein the heat collector comprises a heat sink operatively coupled to the battery array and one or more surfaces, and wherein the routing controller transfers at least another portion of the heat captured by the heat collector from the battery array to the one or more surfaces via the heat sink.

5. The system of claim 1, wherein the heat collector is coupled to a water circulating system and transfers at least another portion of the heat from the battery array to water within the water circulating system, resulting in heated water, and wherein the routing controller facilitates flow of the heated water from the water circulating system to a plumbing system connected to the water circulating system.

6. The system of claim 1, wherein the routing controller selects a power source to be utilized by an electrical subsystem coupled to the system from the group consisting of the battery array, a power grid, and an electrical generator.

7. The system of claim 6, wherein the electrical generator comprises at least one of a wind generator, a solar generator, or a hydroelectric generator.

8. The system of claim 6, wherein the routing controller selects the power source based on at least one of an energy cost associated with respective power sources, estimated energy use of the electrical subsystem, or estimated stress on the battery array associated with powering the electrical subsystem.

9. The system of claim 1, wherein the routing controller selects a power source for charging the batteries of the battery array from the group consisting of a power grid, the heat collector, and an electrical generator.

10. The system of claim 9, wherein the routing controller facilitates storing energy from the power grid by the battery array at a first time and using energy stored by the battery array at a second time that is distinct from the first time.

11. A method, comprising:
capturing, by a heat collector, heat associated with at least one of charge cycles or discharge cycles of respective batteries of a battery array, resulting in captured heat;
initiating, by a controller device comprising a processor, transfer of at least a portion of the captured heat to a thermal generator,
converting, by the thermal generator, the at least the portion of the captured heat to electrical energy;
monitoring, by the controller device, a status of a device associated with the battery array; and
based on the status, initiating, by the controller device, transfer of part of the electrical energy as an energy source to the device based on the monitoring.

12. The method of claim 11, wherein the initiating further comprises initiating transfer of another part of the electrical energy to at least one of a power grid or the battery array.

13. The method of claim 11, wherein the device is a climate control system comprising a ventilator, the climate control system being configured to heat an area associated therewith via the ventilator using heat transferred to the climate control system.

14. The method of claim 11, further comprising initiating, by the controller device, transfer of at least another portion of the captured heat to a water circulating system, the water circulating system being configured to heat water associated with a plumbing system connected to the water circulating system.

15. The method of claim 11, further comprising:
selecting, by the controller device, power sources to be utilized by the one or more subsystems from the group consisting of the battery array, a power grid, and an electrical generator.

16. A non-transitory computer readable storage medium having instructions stored thereon, wherein the instructions, when executed by at least one processor of a system, causes the at least one processor to:
receive information associated with captured heat associated with at least one of charge cycles or discharge cycles of respective batteries of a battery array, wherein the captured heat is captured by a heat collector;
initiating transfer of at least a portion of the captured heat to a thermal generator that converts of the at least the portion of the captured heat to electrical energy;
monitor a status of a device; and
based on the status, initiate transfer of part of the electrical energy as an energy source to the device.

17. The non-transitory computer readable storage medium of claim 16, wherein the instructions further cause the at least one processor to:
initiate transfer another part of the electrical energy to at least one of a power grid or the battery array.

18. The non-transitory computer readable storage medium of claim 16, wherein the instructions further cause the at least one processor to:
select power sources to be utilized by one or more subsystems from the group consisting of the battery array, a power grid, and an electrical generator.

19. The system of claim 1, wherein the device is a water heater.

20. The method of claim 11, wherein the device is a water heater.

* * * * *